Sept. 19, 1933.  F. CHUFAR ET AL  1,927,308
AUTOMOBILE HEADLIGHT MECHANISM
Filed Feb. 4, 1933  2 Sheets-Sheet 1
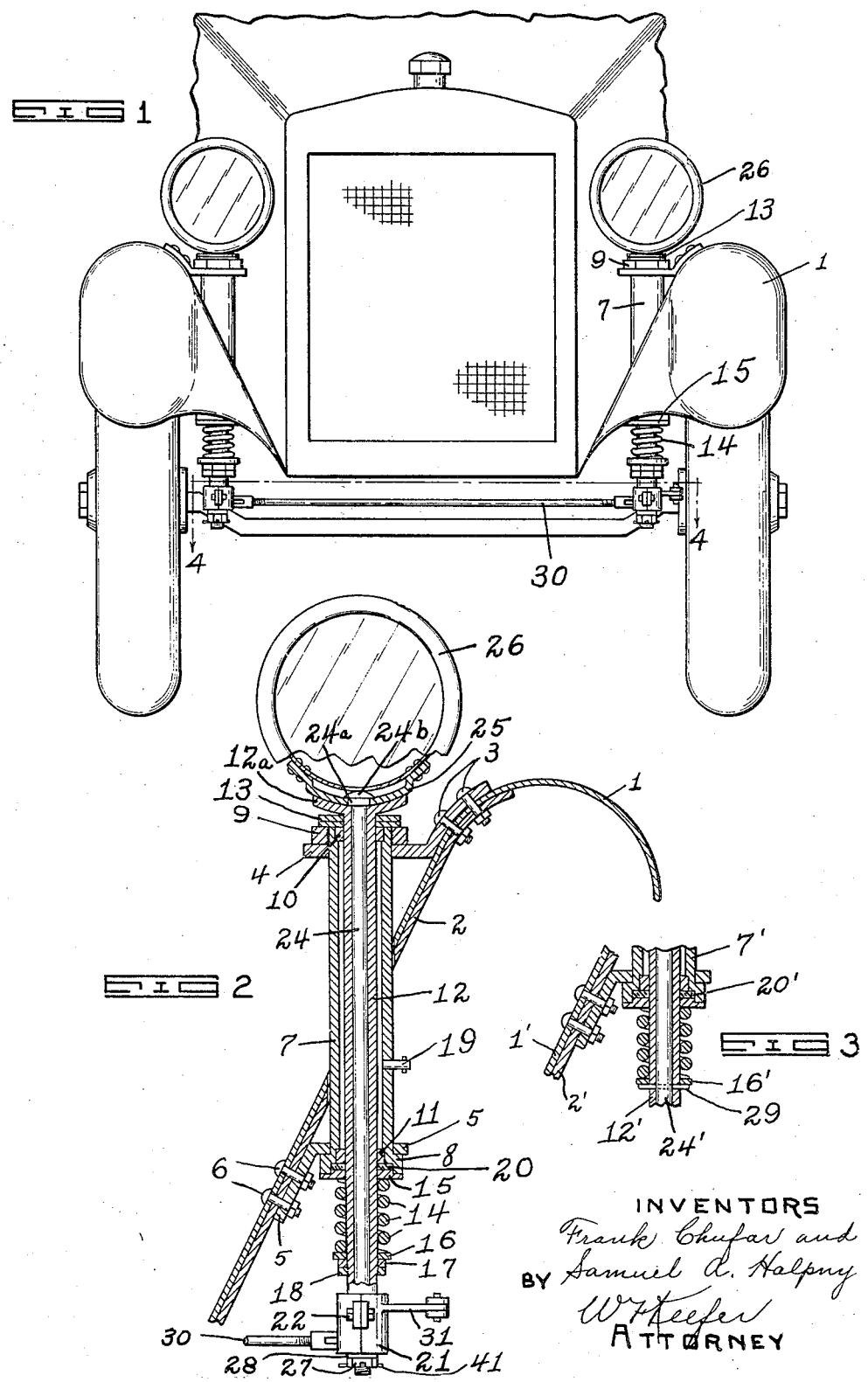

Sept. 19, 1933.  F. CHUFAR ET AL  1,927,308
AUTOMOBILE HEADLIGHT MECHANISM
Filed Feb. 4, 1933  2 Sheets-Sheet 2
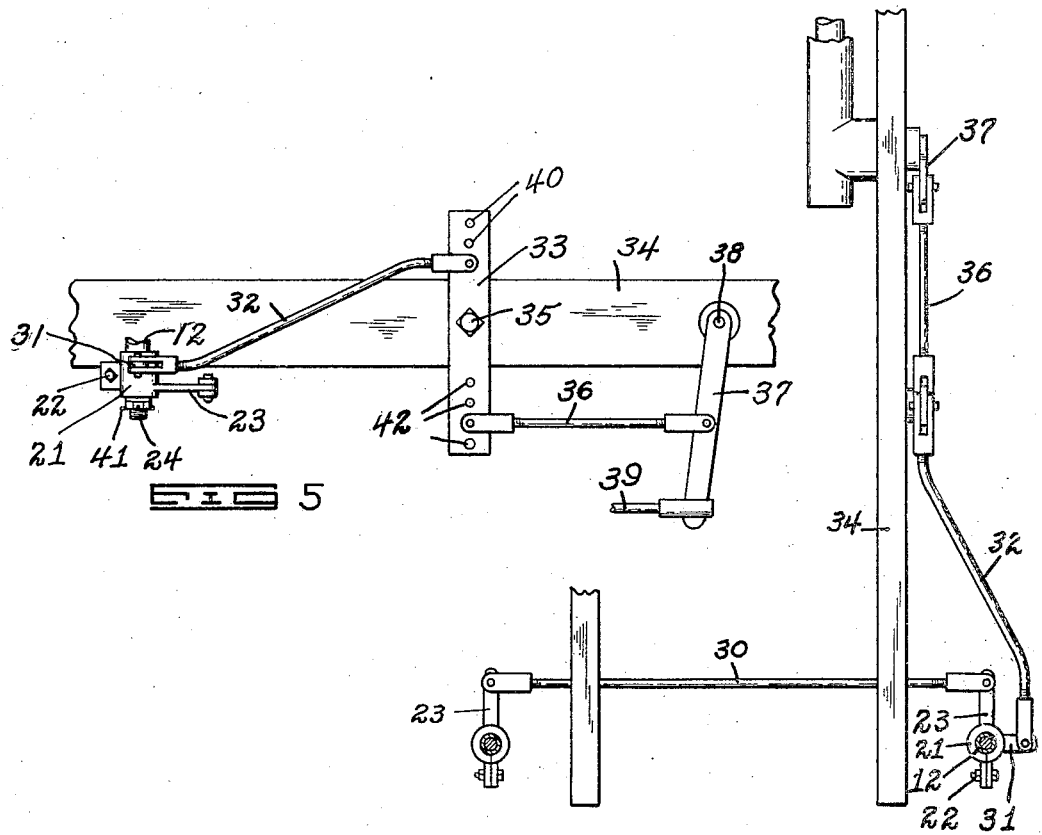
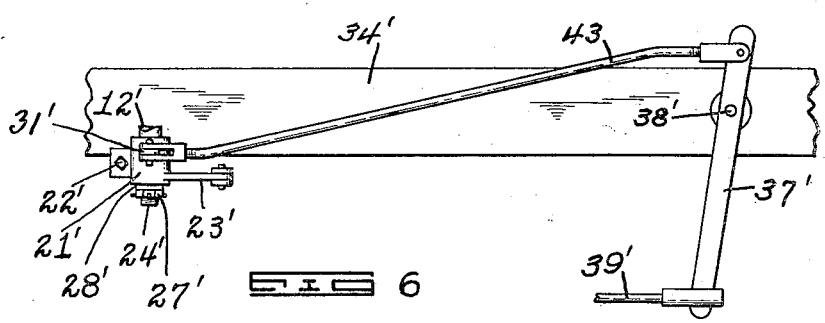
INVENTORS
Frank Chufar and
Samuel A. Halpny
BY
W. Keefer
ATTORNEY Patented Sept. 19, 1933

1,927,308

UNITED STATES PATENT OFFICE 1,927,308

AUTOMOBILE HEADLIGHT MECHANISM

Frank Chufar and Samuel A. Halpny, Wheeling, W. Va.

Application February 4, 1933. Serial No. 655,228

2 Claims. (Cl. 240—62.52)

This invention relates to dirigible mechanisms for automobile headlights, and has for its objects to provide a device of the character mentioned which can be installed upon automobiles of ordinary construction now in general use with a minimum of alteration of the parts of such automobiles.

Another object of this invention is to provide a device with which can be used without alteration a headlight of ordinary construction of a kind now in general use, the entire headlight, including the casing, being dirigible.

And another object of this invention is to provide a device the moving parts of which are lubricated, all parts of which requiring adjustment are exposed and readily accessible, which is vibration-resisting, and which may be readily dismounted from the automobile without damage thereto.

And a still further object is to provide a device of the character mentioned which permits of ready adjustment of the headlights vertically, and the degree of horizontal rotation of which may be regulated by a simple adjustment of exposed parts.

In describing the invention in detail, reference is made to the accompanying drawings, forming a part hereof, in which—

Figure 1 is a fragmentary elevation of an automobile, with various parts omitted, upon which this invention has been installed;

Figure 2 is a vertical sectional view of the post and accompanying mechanism upon which the headlight is supported;

Figure 3 is a fragmentary view of a portion of such mechanism illustrating a modified form of construction;

Figure 4 is a plan view taken on the line 4—4 of Figure 1;

Figure 5 is a side elevation of the mechanism by which this invention is attached to the steering mechanism of the automobile; and Figure 6 illustrates an alternative construction which may be used in lieu of that shown in Figure 5.

In said drawings, in which like designating characters indicate like parts throughout the several views, the numeral 1 indicates the fender and 2 the fender brace of an automobile. Attached to said fender, as by rivets or bolts 3, near the uppermost part thereof, is a bracket 4, and a second bracket 5 is mounted upon the under side of said fender brace 2 near the lower end thereof, or upon the frame of the automobile, as by rivets or bolts 6.

A tubular column or casing 7, having formed upon its lower extremity an annular flange 8 and having its upper end externally threaded, is held in rigid vertical position by said brackets 4 and 5, said flange 8 being drawn up tightly against the bracket 5 by means of a nut 9 threaded upon the upper end of said casing into seated position against the upper surface of said bracket 4. Said casing carries, at its extremities, bushings 10 and 11.

Rotatably disposed within said casing 7 and in bearing relation to said bushings 10 and 11, is a tube 12 bearing an upwardly cupped annular flange 12a at its upper extremity. Said flange rests upon one or more washers 13 encircling said tube (two such washers being shown), and interposed between said flange 12a and the upper extremity of the casing 7, which washers facilitate rotation of said flange with respect to said casing. And said flange 12a is normally maintained in seated relation upon said washers 13 by means of a spiral spring 14 encircling said tube 12 below the lower extremity of the casing 7. A washer 15 is interposed between the upper end of said spring and the flange 8 of said casing, and said spring is supported at its lower end by a washer 16 which in the preferred embodiment of this invention rests upon the upper of two lock-nuts 17 and 18 threaded upon the exterior surface of said tube 12, in a manner well understood in the art. Manifestly, tension of the spring 14 may be regulated by adjusting the lock-nuts 17 and 18.

In order to facilitate rotation of the tube 12 within the casing 7, a lubricant may be injected into the interstice therebetween, as by means of a grease plug 19; and escape of such lubricant downward is hindered by a packing ring 20 inserted within the flange 8 of said casing. The upper surface of the washer 15 is preferably offset so as to exert some pressure upon said packing and thus to retain the same at all times seated snugly against all adjacent surfaces.

Attached to said tube 12 below said lock-nuts 17 and 18 is a split-sleeve clamp 21 held in binding relation to said tube by a bolt 22; and formed integral with said clamp and extending rearwardly therefrom is a crank arm 23.

Slidably received within said tube 12 is a bolt 24 which carries a compound head consisting of a square portion 24a adjacent to the shank of said bolt and a rounded portion 24b somewhat larger in diameter than said square portion, so as to form a shoulder between said square and said rounded portions. The smallest diameter of the square portion of said nut is just wide enough to allow the same to traverse the slot of the adjusting cup 25 of a headlight casing 26 of ordinary construction, but the shoulder formed by the rounded portion of said head seats upon the inner surface of said cup and, when said bolt 24 is drawn downward, retains said headlight in fixed position with respect to said bolt, in a manner well understood in the art. And adjustment in a vertical plane of the beam of light from said headlight, or tilting of the horizontal axis thereof, is accomplished by sliding said adjusting cup forward or backward with respect to said head (the slot formed in said cup permitting such movement) in a manner likewise well-known in the art. Said headlight is retained in locked or fixed position with respect to said tube 12 by means of a nut 27 threaded upon the lower end of said bolt into tightly impinging relation to a lock-washer 28 interposed between said nut and the lower extremity of said tube 12. Manifestly, if desired, rotation of said nut with respect to said bolt may be further safeguarded by the use of a cotter pin 41 directed there through, in a manner well-known in automobile construction. And adjustment of the axis of said headlight in a vertical plane may be accomplished in the manner just described without any greater disarrangement of parts than the unscrewing of said nut 27 sufficiently to release the tension of the head portion 24b upon the adjusting cup 25; and, manifestly, entire removal of said bolt 24 and the headlight from the mechanism is permitted by no greater dismantling of the structure than removal of said nut 27 and the washer 28 from said bolt 24, all other parts remaining assembled.

In lieu of the lock-nuts 17 and 18 shown in the preferred embodiment of this invention, there may be employed the construction illustrated in Figure 3, wherein the spring-supporting washer 16' rests upon a pin 29 directed through both the tube 12' and the bolt 24'. This form of construction, as will be readily understood, affords another means of retaining the bolt 24' in fixed relation to the tube 12'.

A mechanism of the kind thus far described is used with respect to each headlight and the two headlights and accompanying rotatable supports are caused to rotate simultaneously by means of a connecting rod 30, joining the corresponding levers 23, as most clearly shown in Figures 1 and 4.

Extending outwardly, preferably toward the left, (considering one facing in the same direction as the automobile) from, and formed integrally with the clamp 21 and at right angles to the arm 22, is a crank arm 31, which is connected by a pitman 32 (shown in Figures 4 and 5) to the upper arm of a lever 33. Said lever 33 is pivoted near its middle point to the frame 34 of the automobile by means of a bolt 35; and a rod 36 connects the lower arm of said lever 33 with the steering lever 37 of the automobile, at a point intermediate its pivotal point 38 and the point at which the ordinary drag link 39 is attached thereto. A series of apertures 40 and 42 are provided in the lever 33 so as to permit adjustment of the rods 32 and 36 for the purpose of varying the amount of movement or thrust imparted to the arm 31 with respect to the steering lever 37, in a manner which will be readily understood.

In lieu of the mechanism illustrated in Figure 4, the crank arm 31' may be connected, by a rod 43 (shown in Figure 6) to an arm 37' formed upon or attached to and extending upwardly from the pivotal point of the steering lever 37. Such a construction, however, when used on some makes of automobiles now in general use, may be difficult or impossible of installation without alteration in the form of the superjacent fender. And, of course, if the crank arm 31 be extended inwardly instead of outwardly as shown, the rear end of the rod 43 could be attached to the steering lever 37 intermediate its pivotal point and the point at which the drag link 39 is attached.

In operation, movement of the steering lever 37 (Figure 5) forward which would, through the intermediacy of the drag link 43 and accompanying mechanism of the standard automobile, cause the front wheels of the automobile to turn toward the left, would simultaneously impart a thrust to the rod 36, which would rock the lever 33 so as to cause it to draw rearwardly the pitman 32 and the crank arm 31, thus rotating toward the left the tube 12 and attached parts, including the headlight 26, and vice versa.

We claim—

1. A dirigible mechanism for headlights comprising a tubular casing fixed in a vertical position to the body portion of an automobile, a tube rotatably received within and extending through said casing, a flange formed upon the upper end of said tube, said flange resting upon the upper end of said casing, a spiral spring surrounding said tube below said casing and normally preventing longitudinal movement of said tube with respect to said casing, a headlight mounted upon said flange, a bolt slidably received within said tube and having a head received within said headlight in slidable but non-rotatable relation thereto, means for holding said bolt and said headlight in fixed relation to said tube, a crank-arm secured to said tube, a lever pivoted intermediate its ends to the body of said automobile, a rod connecting one arm of said last-mentioned lever to said crank-arm, and a second rod connecting the other arm of said lever to the steering lever of an automobile.

2. A dirigible mechanism for headlights comprising a tubular casing fixed in a vertical position to the body of an automobile, a tube rotatably received within and extending through said casing, a flange formed upon the upper end of said tube, said flange resting upon the upper end of said casing, means normally hindering longitudinal movement of said tube with respect to said casing, a headlight mounted upon said flange, a bolt slidably received within said tube and having a head received within the casing of said headlight in non-rotatable relation thereto, means for holding said bolt and said headlight in fixed relation to said tube, and means actuated by the steering mechanism of said automobile for rotating said tube.

FRANK CHUFAR.
SAMUEL A. HALPNY.